United States Patent
Wakamoto

(10) Patent No.: US 6,199,372 B1
(45) Date of Patent: Mar. 13, 2001

(54) APPARATUS AND METHOD FOR REGENERATING NO$_X$ CATALYST FOR DIESEL ENGINE

(75) Inventor: Koutaro Wakamoto, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/171,858

(22) PCT Filed: Apr. 24, 1997

(86) PCT No.: PCT/JP97/01418

§ 371 Date: Oct. 23, 1998

§ 102(e) Date: Oct. 23, 1998

(87) PCT Pub. No.: WO97/41336

PCT Pub. Date: Jun. 11, 1997

(30) Foreign Application Priority Data

Apr. 26, 1996 (JP) .................................................. 8-130885

(51) Int. Cl.⁷ ........................................................ F01N 3/00
(52) U.S. Cl. .................. 60/274; 60/276; 60/277; 60/285; 60/301; 60/303; 60/295
(58) Field of Search .............. 60/274, 286, 295, 60/301, 303, 285, 277

(56) References Cited

U.S. PATENT DOCUMENTS 5,174,111  * 12/1992  Nomura et al. .................. 60/285
5,201,802  *  4/1993  Hirota et al. .................... 60/276

FOREIGN PATENT DOCUMENTS

| 60-33974 | 8/1985 | (JP) . |
| 6-66129 | 3/1994 | (JP) . |
| 7-217474 | 8/1995 | (JP) . |
| 8-61052 | 3/1996 | (JP) . |

* cited by examiner

Primary Examiner—Jeanette Chapman
Assistant Examiner—Sneh Varma
(74) Attorney, Agent, or Firm—Sidley & Austin

(57) ABSTRACT

The present invention is an apparatus and a method for regenerating an NO$_X$ catalyst for a diesel engine, which is capable of regenerating the NO$_X$ catalyst having a lower performance due to accumulated SO$_x$. For this purpose, the regeneration apparatus includes an NO$_X$ catalyst (3) in an exhaust pipe (2), a reductant fuel adding nozzle (7), a flow rate control valve (10) for controlling a feed rate of reductant fuel supplied to the reductant fuel adding nozzle (7), an inlet temperature sensor (14) of the NO$_X$ catalyst (3), and a regeneration control unit (17) for computing the quantity of SO$_X$ taken into the NO$_X$ catalyst (3) during a period of time in which the inlet temperature is not higher than a predetermined value with a zero feed rate instruction given to the flow control valve (10), and for outputting an instruction for supplying a quantity of the reductant fuel which is larger than a predetermined quantity thereof which is suitable for the operational condition of the diesel engine (1) when the inlet temperature exceeds a predetermined value and the reductant fuel is started to be added.

19 Claims, 9 Drawing Sheets

SOx DETERIORATION PROCESS

SOx DETERIORATION STATE

REACTIVATION PROCESS

REACTIVATION STATE

APPARATUS AND METHOD FOR REGENERATING $NO_x$ CATALYST FOR DIESEL ENGINE

TECHNICAL FIELD

The present invention relates to an apparatus and a method for regenerating $NO_x$ catalyst for a diesel engine, and the invention particularly relates to an apparatus and a method for regenerating $NO_x$ catalyst for a diesel engine which has lower performance.

BACKGROUND ART

Conventionally, Japanese Laid-open Patent No. 4-330314 describes a catalyst type exhaust emission control device for a diesel engine, which reduces and decomposes $NO_x$ contained in the exhaust emissions from a diesel engine. According to Japanese Laid-open Patent No. 4-330314, the device is composed of a copper-zeolite $NO_x$ catalyst provided in an exhaust path of a diesel engine, a hydrocarbon sensor for detecting the hydrocarbon concentration in the exhaust emissions, and a fuel spraying means which is provided in the exhaust path at the upstream side of the hydrocarbon sensor and which sprays fuel into the exhaust path to control the hydrocarbon concentration in the exhaust emissions within a predetermined range. According to the aforesaid configuration, based on a detected value of the hydrocarbon concentration, fuel is appropriately sprayed into the exhaust path from the fuel spraying means, and the hydrocarbon concentration in the exhaust emissions is kept within the predetermined range. The fuel sprayed from the fuel spraying means acts as a hydrocarbon reductant, and activates the copper-zeolite $NO_x$ catalyst in association with oxygen contained in the exhaust emissions from the diesel engine. Thus, it is proposed that the reduction of $NO_x$ in the exhaust emissions is promoted. However, the copper-zeolite $NO_x$ catalyst has a low performance in controlling $NO_x$.

Accordingly, in order to obtain a higher performance in controlling $NO_x$, a large quantity of hydrocarbon for reduction is necessary, and this is disadvantageous in the operational cost of the catalyst.

On the other hand, an $NO_x$ catalyst containing an alkali-earth or a rare-earth oxide and a precious metal, and an $NO_x$ catalyst having silver as an active component show a higher efficiency of controlling $NO_x$ with a smaller quantity of reductant hydrocarbon as compared with a copper-zeolite catalyst.

However, the high-performance $NO_x$ catalyst containing an alkali-earth or a rare-earth oxide and a precious metal, and the $NO_x$, catalyst having silver as an active component enable highly efficient control of $NO_x$, but have a disadvantage in that they have a lower durability against $SO_x$, and therefore it is difficult to put them into practical use.

SUMMARY OF THE INVENTION

The present invention is made to mitigate the aforesaid disadvantages, and its object is to provide an apparatus and a method for regenerating the $NO_x$ catalyst having a low performance as a result of $SO_x$ being accumulated in the $NO_x$ catalyst due to sulfur in the fuel supplied to a diesel engine. The $NO_x$ catalyst applied to the present invention is not limited to the $NO_x$, catalyst containing an alkali-earth or a rare-earth oxide and a precious metal, or the $NO_x$ catalyst having silver as an active component, as described above, but any $NO_x$ catalyst can be applied if it is an $NO_x$ catalyst which is generally deteriorated by $SO_x$ in the exhaust emissions in a short time.

In order to attain the aforesaid object, a first aspect of an apparatus for regenerating an $NO_x$, catalyst for a diesel engine according to the present invention is an $NO_x$ catalyst device for a diesel engine, which reduces and controls $NO_x$ in exhaust gas by adding into an exhaust pipe a quantity of diesel fuel, such as kerosene, as a reductant fuel being a reductant hydrocarbon, and by using an $NO_x$ catalyst which is disposed in the exhaust pipe and the performance of which is easily lowered by absorbing $SO_x$, characterized by including: a reductant fuel adding nozzle, for adding a reductant fuel into the exhaust pipe;

a flow rate control valve, for controlling a feed rate of the reductant fuel to the reductant fuel adding nozzle; an $NO_x$ catalyst inlet temperature sensor, disposed at an upstream side of the $NO_x$ catalyst; and a regeneration control unit, for computing the quantity of $SO_x$ taken into the $NO_x$ catalyst during a period of time, in which a signal from the $NO_x$ catalyst inlet temperature sensor indicates that the inlet temperature of the $NO_x$ catalyst is not higher than a predetermined value and an instruction of a zero feed rate is given to the flow rate control valve based on the quantity of the diesel fuel supplied to the diesel engine during the period of time of zero feed rate of the reductant fuel, and when the inlet temperature exceeds a predetermined value and the reductant fuel is started to be added, for outputting to the flow rate control valve an instruction for supplying a quantity of reductant fuel which is larger than a quantity which is suitable for the current operational condition of the diesel engine, and is characterized by the apparatus regenerating the $NO_x$ catalyst, which has low performance due to $SO_x$, by adding the quantity of the reductant fuel which is larger than the quantity which is suitable for the current operational condition.

A second aspect of the invention, based on the first aspect of the invention of the apparatus for regeneration, is characterized by including either a selector switch, for indicating the kind of diesel fuel for the diesel engine, or a component sensor, for detecting the sulfur content in the diesel fuel, and characterized by the regeneration control unit computing the quantity of $SO_x$ discharged from the diesel engine from the feed rate of the diesel fuel to the diesel engine and a signal sent from either the selector switch or the component sensor; and when the inlet temperature becomes a predetermined value or over and the reductant fuel is started to be added, outputting to the flow rate control valve an instruction to supply a quantity of the reductant fuel which is larger than a predetermined quantity which is suitable for the operational condition of the diesel engine.

A third aspect of the invention of the apparatus for regeneration is an $NO_x$ catalyst device for a diesel engine, which reduces and controls $NO_x$ in the exhaust gas by adding into an exhaust pipe a predetermined quantity of diesel fuel, such as kerosene, as a reductant fuel being a reductant hydrocarbon, and by using an $NO_x$ catalyst which is disposed in the exhaust pipe and which has a performance which is easily lowered by absorbing $SO_x$, characterized by including; a reductant fuel adding nozzle, for adding a reductant fuel into the exhaust pipe at an upstream side of the $NO_x$ catalyst; a flow rate control valve, for controlling a feed rate of the reductant fuel to the reductant fuel adding nozzle; an $NO_x$ catalyst inlet temperature sensor, disposed at an upstream side of the $NO_x$ catalyst; a hydrocarbon concentration sensor, disposed at a downstream side of the $NO_x$ catalyst; and a regeneration control unit; and is characterized by the regeneration control unit outputting to the flow rate control valve an instruction, for adding a quality of the reductant fuel which is larger than a predetermined quantity which is suitable for the operational condition of the diesel engine, when a signal from the NOx catalyst inlet temperature sensor indicates that the inlet temperature of the $NO_X$ catalyst is higher than a predetermined value, and a signal from the hydrocarbon concentration sensor indicates that the hydrocarbon concentration at the downstream side of the $NO_X$ catalyst is greater than a predetermined value, to regenerate the $NO_X$ catalyst which has a low performance due to $SO_x$.

A first aspect of the invention of a method for regenerating an $NO_X$ catalyst for a diesel engine relates to a $NO_X$ catalyst device for a diesel engine, which reduces and controls $NO_X$ in the exhaust gas by adding into an exhaust pipe a predetermined quantity of diesel fuel, such as kerosene, as a reductant fuel being a reductant hydrocarbon, and by using an $NO_X$ catalyst which is disposed in the exhaust pipe and which has a performance which is easily lowered by absorbing $SO_x$, and in characterized by including the steps of: on regenerating the $NO_X$ catalyst which has low performance due to $SO_x$, computing the quantity of $SO_x$ which is taken into the $NO_X$ catalyst during a period of time in which the diesel engine is operated and the addition of the reductant fuel is stopped due to the inlet temperature of the $NO_X$ catalyst being not higher than a predetermined value, and adding a quantity of the reductant fuel, which is larger than a predetermined quantity of reductant fuel which is suitable for the current operational condition, to regenerate the $NO_X$ catalyst deteriorated by $SO_x$, when the operational condition of the diesel engine is changed with the inlet temperature being higher than the predetermined value and the reductant fuel being added.

A second aspect of the invention, based on the first aspect of the invention of the method for regeneration, has a characteristic that the quantity of reductant fuel, which is larger than the predetermined quantity of reductant fuel which is suitable for the current operational condition, is a combination of the quantity of reductant fuel, which is suitable for the operational condition, and a fixed quantity of reductant fuel which is irrespective of the operational condition of the engine.

A third aspect of the invention, based on the first aspect of the invention of the method for regeneration, has a characteristic that the quantity of reductant fuel, which is larger the predetermined quantity of reductant fuel which is suitable for the operational condition, is a combination of the quantity of reductant fuel which is suitable for the operational condition and an increment thereof at a fixed ratio.

A fourth aspect of the invention, based on the first aspect of the invention of the method for regeneration, has a characteristic that the quantity of reductant fuel, which is larger than the predetermined quantity of reductant fuel which is suitable for the operational condition, is a variable quantity which is obtained by computing from the $NO_X$ concentration in the exhaust gas, the exhaust gas flow rate, and the exhaust gas temperature, which are determined by the operational condition, and the quantity of $SO_x$ taken into the $NO_X$ catalyst.

A fifth aspect of the invention, based on the first aspect of the invention of the method for regeneration, has a characteristic that the quantity of $SO_x$ taken into the $NO_X$ catalyst is computed from a feed rate of the diesel fuel to the diesel engine.

A sixth aspect of the invention, based on the first aspect of the invention of the method for regeneration, has the characteristics that, when the operational condition of the diesel engine is changed with the inlet temperature being not higher than a predetermined value and the addition of reductant fuel is stopped before the regeneration of the $NO_X$ catalyst is completed, the cumulative quantity of $SO_x$ in the $NO_X$ catalyst at the time of stopping the addition is stored; and that the quantity of $SO_x$ accumulated in the $NO_X$ catalyst, during a period of time in which the addition of the reductant fuel is stopped, is obtained by successively adding to the stored cumulative quantity of $SO_x$ the quantity of $SO_x$ which is taken into the $NO_X$ catalyst according to the operational condition of the diesel engine during the period of time of stopping.

A seventh aspect of the invention, based on the first aspect of the invention of the method for regeneration, has the characteristics that, when the diesel engine is stopped, before the regeneration of the $NO_X$ catalyst is completed, the cumulative quantity of $SO_x$ in the $NO_X$ catalyst at the time of stopping is stored; that after the diesel engine is stopped, the cumulative quantity of $SO_x$ is held; and that the next time the diesel engine is operated, the quantity of $SO_x$, which is newly taken into the $NO_X$ catalyst, is successively added to the stored cumulative quantity of $SO_x$.

An eighth aspect of the invention, based on the first aspect of the invention of the method for regeneration, has a characteristic that the quantity of $SO_x$, which is taken into the $NO_X$ catalyst, is obtained from the sulfur content in the diesel fuel supplied to the diesel engine.

A ninth aspect of the invention, based on the first aspect of the invention of the method for regeneration, has a characteristic that when the regeneration of the $NO_X$ catalyst is completed, the quantity of reductant fuel, which is larger than the predetermined quantity of reductant fuel which is suitable for the operational condition, is changed to a quantity which is suitable for the current driving condition of the diesel engine at the time of the completion of the regeneration.

A tenth aspect of the invention, based on the ninth aspect of the invention of the method for regeneration, has a characteristic that a point in time, at which the regeneration of the $NO_X$ catalyst is determined to be completed, is the time when a calculated quantity of residual $SO_x$ during regeneration becomes equals to or less than a predetermined value, after successively computing the quantity of $SO_x$ which is eliminated from the $NO_X$ catalyst during regeneration and, at the same time, computing the quantity of residual $SO_x$ during regeneration by subtracting the quantity of the eliminated $SO_x$ from the quantity of $SO_x$ remaining in the $NO_X$ catalyst.

An eleventh aspect of the invention, based on the tenth aspect of the invention of the method for regeneration, has a characteristic that the quantity of $SO_x$, which is eliminated from the $NO_X$ catalyst during the regeneration, is obtained by computing from any one of the following: the $NO_X$ concentration in the exhaust gas, the flow rate of the exhaust gas, and the exhaust gas temperature, which are determined by the operational condition of the diesel engine during regeneration; the quantity of $SO_x$ which is taken into the $NO_X$ catalyst; and the quantity of the added reductant fuel.

A twelfth aspect of the invention of a method for regeneration relates to a $NO_X$ catalyst device for a diesel engine, which reduces and controls $NO_X$ in the exhaust gas by adding into an exhaust pipe a predetermined quantity of diesel fuel, such as kerosene, as a reductant fuel being a reductant hydrocarbon, and by using an $NO_X$ catalyst which is disposed in the exhaust pipe and which has a performance which is easily lowered by absorbing $SO_x$, characterized by including the step of on regenerating the $NO_X$ catalyst which is deteriorated by $SO_x$, adding a quantity of the reductant fuel which is larger than a predetermined quantity which is suitable for the operational condition of the diesel engine when the inlet temperature at the upstream side of the $NO_x$ catalyst is higher than a predetermined value and the hydrocarbon concentration at the downstream side of the $NO_x$ catalyst is greater than a predetermined value.

The principal of the action, according to the aforesaid present invention, will be explained by taking a $NO_x$ catalyst containing an alkali-earth or a rare-earth oxide and a precious metal as an example. It has been found that an $NO_x$ catalyst containing an alkali-earth or a rare-earth oxide and a precious metal is abruptly deteriorated by $SO_x$ in the exhaust emissions when a reductant hydrocarbon is not added to the $NO_x$ catalyst, or when the temperature of the catalyst is lower than a predetermined temperature, and does not act as $NO_x$ control reaction even if the reductant hydrocarbon is added thereto. Further, the catalyst, which is deteriorated by taking in $SO_x$, releases from the surface of the catalyst the $SO_x$ which has been taken in, and restores the performance. It is known that the restoring speed depends on the temperature of the exhaust emissions, the $NO_x$ concentration (quantity) in the exhaust emissions, the quantity of reductant hydrocarbon added to the exhaust emissions, and the quantity of $SO_x$ taken into the $NO_x$ catalyst. The present invention is made based on the above knowledge. For this purpose, first of all, the quantity of $SO_x$ in the exhaust emissions is obtained from the feed rate of the fuel supplied to the diesel engine, when the temperature at the upstream side of the $NO_x$ catalyst and the load on the engine are less than predetermined values, to compute the quantity of $SO_x$ taken into the $NO_x$ catalyst. The computing processing is continued, during a period of time in which the engine is being driven with the temperature at the upstream side of the catalyst being lower than a predetermined value, to integrate the quantity of $SO_x$ taken into the $NO_x$ catalyst. Thereafter, when the operational condition of the engine is changed and the temperature of the inlet of the $NO_x$ catalyst becomes higher than a predetermined value, a quantity of the reductant fuel, which is larger than the predetermined quantity of the reductant fuel which is suitable for the current operational condition, is supplied into the exhaust emissions to regenerate the $NO_x$ catalyst in the exhaust pipe. If only the quantity of the reductant fuel suitable for the current operational condition of the engine is supplied, the performance in controlling $NO_x$ is insufficient, and at the same time, the regeneration of the $NO_x$ catalyst deteriorated by $SO_x$ is carried out slowly. Accordingly, it is necessary to supply a quantity of the reductant fuel which is larger than the suitable quantity in order to restore the performance of the $NO_x$ catalyst in a minimal time from the start of the supplying of the reductant fuel.

As shown in FIG. 13A to FIG. 13D, when oxygen and sulfur dioxide in the exhaust emissions enter the $NO_x$ catalyst, the carrier of the active metal in the $NO_x$ catalyst becomes a sulfated carrier, and is deteriorated by the $SO_x$. It is assumed that the carrier, deteriorated by $SO_x$, generates acid ammonium sulfate when hydrocarbon and nitric oxide enter, and the acid ammonium sulfate volatilizes from the pores of the carrier, whereby the carrier is returned to a reactivated state. The speed, at which the acid ammonium sulfate generates, depends on the $NO_x$ concentration, the hydrocarbon concentration in the emissions, and the temperature of the emission; and the speed, at which the acid ammonium sulfate volatilizes, depends on the temperature of the emissions. Accordingly, it is found that the time taken to regenerate the $NO_x$ catalyst by supplying a quantity of the reductant fuel, which is larger than the quantity which suitable for the current operational condition, is determined based on the current operational condition of the diesel engine and the emission temperature at the inlet of the $NO_x$ catalyst.

The $SO_x$ deterioration and regeneration mechanism of the aforesaid $NO_x$ catalyst take place in the $NO_x$ catalyst containing an alkali-earth or a rare-earth oxide and a precious metal, but it can be considered that other $NO_x$ catalysts, such as Ag/alumina, which have abruptly lowered performance, can be also regenerated from $SO_x$ deterioration by the same regeneration mechanism as described above.

BRIEF DESCRIPTION OF THE DRAWINGS

FIG. 13A is an explanatory diagram of a $SO_x$ deterioration process which is a first step;

FIG. 13B is an explanatory diagram of a $SO_x$ deterioration state which is a second step;

FIG. 13C is an explanatory diagram of a reactivation process which is a third step; and FIG. 13D is an explanatory diagram of a reactivation state which is a fourth step.

BEST MODE FOR CARRYING OUT THE INVENTION

Figure 1:
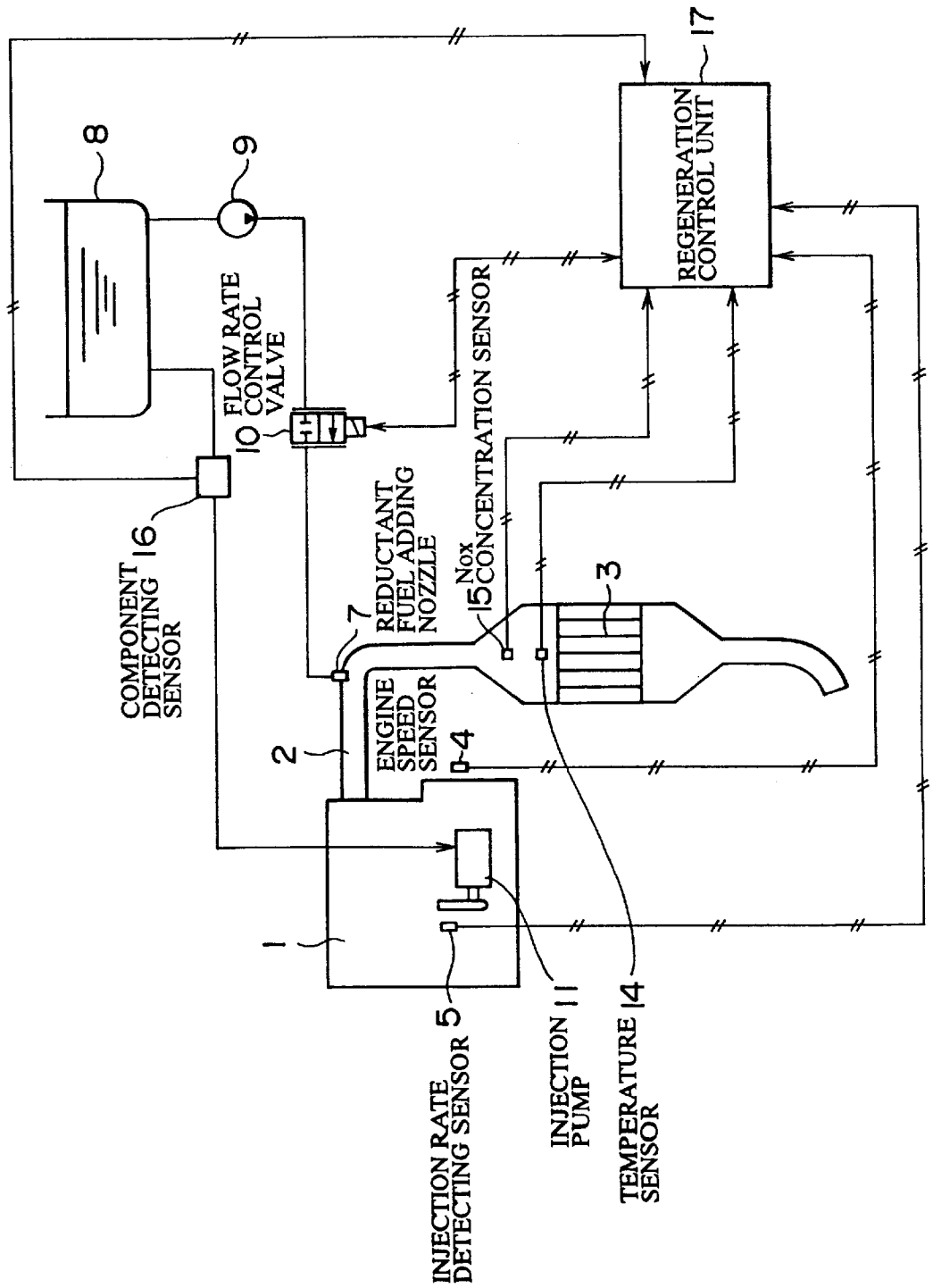
FIG. 1 is an explanatory diagram of a configuration of an apparatus for regenerating a $NO_x$ catalyst for a diesel engine according to a first embodiment of the present invention.

Preferred embodiments of the present invention will now be explained below with reference to the drawings. FIG. 1 is an apparatus for regenerating an $NO_X$ catalyst 3 according to a first embodiment of the present invention, wherein the $NO_X$ catalyst 3, for controlling $NO_X$ in the emissions, is placed in an exhaust pipe 2 from a diesel engine 1 (hereinafter, referred to as an engine 1). The $NO_X$ catalyst 3 contains an alkali-earth or a rare-earth oxide and a precious metal, and is a $NO_X$ catalyst which easily absorbs $SO_x$ (for example, a $NO_X$ catalyst containing barium oxide and palladium, or a $NO_X$ catalyst composed by having silver as an activated component which is carried by alumina).

An engine speed sensor 4, for detecting the engine speed, is disposed at the engine 1. An injection rate detecting sensor 5, for measuring the injection rate of diesel fuel (specifically, the feed rate of diesel fuel to the engine 1), is disposed at a lever (not illustrated) of the engine 1, which interlocks with an accelerator pedal (not illustrated). A reductant fuel adding nozzle 7, for adding reductant fuel (reducing hydrocarbon) to the emissions, is disposed at a portion between the engine 1 and the $NO_X$ catalyst 3. Fuel, fed from a fuel tank 8 through a pump 9, is supplied into the reductant fuel adding nozzle 7 with the flow rate thereof being controlled by a flow rate control valve 10. The flow rate control valve 10 is controlled in response to an instruction from a controller, described below, according to the driving conditions of the engine 1, and supplies a necessary and sufficient amount of the reductant fuel to the reductant fuel adding nozzle 7. Fuel for driving the engine 1 is supplied into an injection nozzle (not illustrated) from the fuel tank 8 by an injection pump 11, and is injected into a cylinder of the engine 1.

A sensor 14, for detecting the inlet temperature of the $NO_X$ catalyst 3 (hereinafter referred to as a temperature sensor 14), and a $NO_X$ concentration sensor 15 are disposed in the exhaust pipe 2 at the upstream side of the $NO_X$ catalyst 3. A component detecting sensor 16, for detecting the concentration of the sulfur component in the fuel for driving the engine 1, is disposed at a portion between the fuel tank 8 and the injection pump 11. It should be noted that the place for setting the component detecting sensor 16 can be in a path for the reductant fuel, or in the fuel tank 8. Each of the sensors 4, 5, 14, 15, and 16 is connected to a regeneration control unit 17. The regeneration control unit 17 comprises a controller, and outputs an instruction for regenerating the $NO_X$ catalyst 3 on receiving signals from the engine speed sensor 4, the injection rate detecting sensor 5, the temperature sensor 14, the $NO_X$ concentration sensor 15, and the component detecting sensor 16. In this embodiment, the temperature of the $NO_X$ catalyst 3 is measured by means of the temperature sensor 14 being attached at the upstream side of the $NO_X$ catalyst 3, but it goes without saying that it is suitable to attach the temperature sensor 14 at the downstream side of the $NO_X$ catalyst 3 to measure the temperature.

Figure 2:
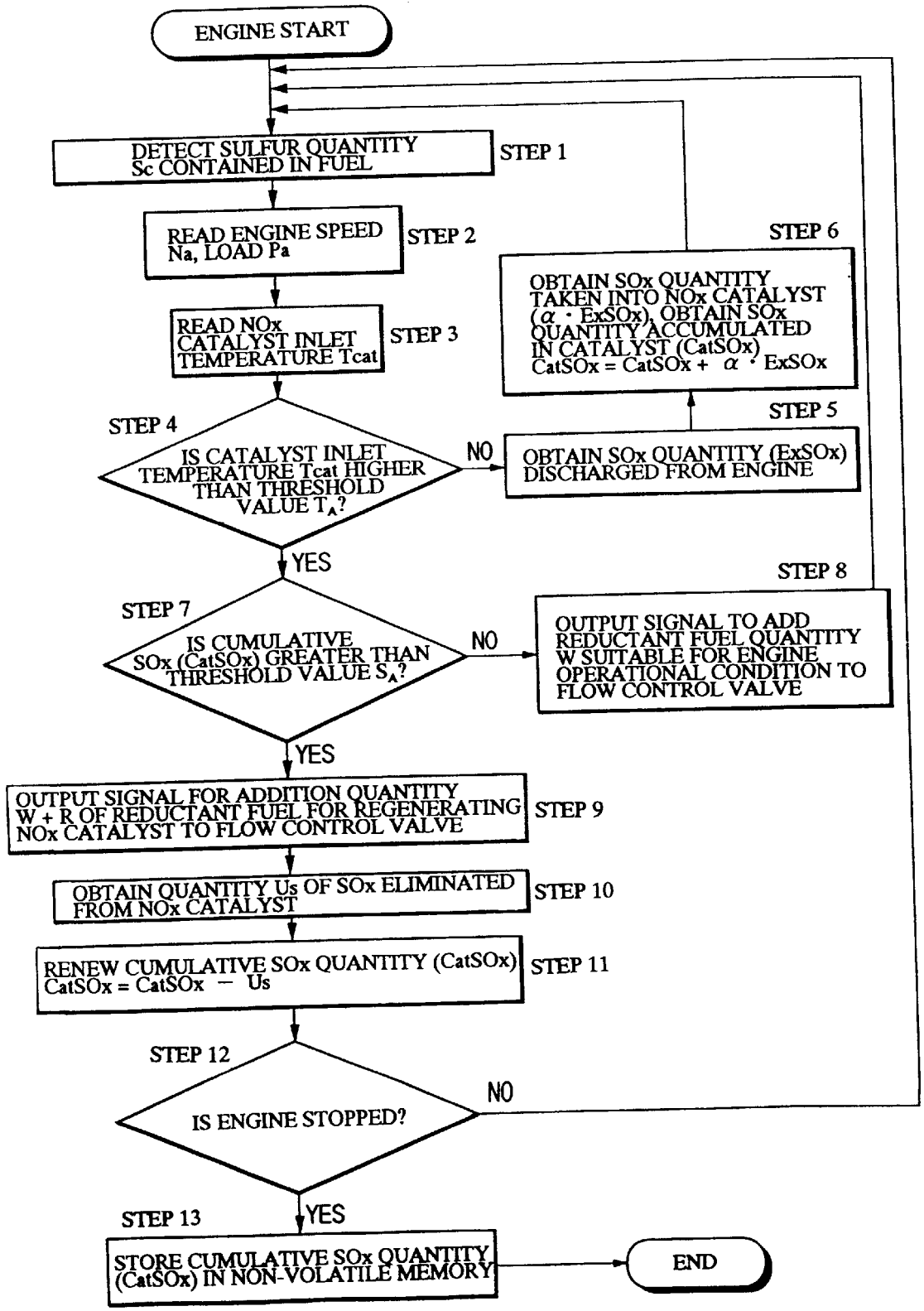
FIG. 2 is a flowchart of a method for regenerating the $NO_x$ catalyst according to the first embodiment of the present invention.

A method for regenerating the $NO_X$ catalyst 3 with the aforesaid configuration will be explained with reference to a flowchart shown in FIG. 2.

In step 1, the concentration of sulfur Sc, contained in the fuel for operating the engine 1, is detected by means of the component detecting sensor 16. In step 2, an operational condition, such as the rotational speed Na of the engine 1 and the load Pa acting on the engine 1, is obtained by means of the regeneration control unit 17, based on the signals from the engine speed sensor 4 and the injection rate detecting sensor 5. In step 3, the inlet temperature Tcat of the $NO_X$ catalyst 3 is read by means of the temperature sensor 14.

In step 4, it is determined whether or not the inlet temperature Tcat of the $NO_X$ catalyst 3 is higher than a threshold value TA. For example, in a truck, a generator, or the like, when the exhaust temperature is lower with a lower load, the $NO_X$ catalyst 3 doesn't work; therefore, it is necessary to stop adding the reductant fuel. Under the condition in which the addition of the reductant fuel is stopped, the $NO_X$ catalyst 3 suffers $SO_x$ deterioration.

In step 4, when the inlet temperature Tcat of the $NO_X$ is lower than the threshold value TA, a command is given to proceed to step 5. In step 5, the quantity of $SO_x$ ($ExSO_x$), which is discharged from the engine 1, is obtained by a computation. The quantity of $SO_x$ is determined by the kind of fuel used and the quantity of the fuel burnt in the engine 1, and in this embodiment, this is obtained from the feed rate of the fuel into the cylinder of the engine 1, based on the operational condition of the engine 1 which is read in step 2, specifically, the engine speed Na and the load Pa.

In step 6, the quantity of $SO_x$ taken into the $NO_X$ catalyst $\alpha \cdot ExSO_x$) is obtained from the quantity of discharged $SO_x$ ($ExSO_x$), and the cumulative quantity of $SO_x$ ($CatSO_x$) is obtained. In this embodiment, the cumulative quantity of $SO_x$ taken into the $NO_X$ catalyst 3 ($CatSO_x$) is computed by [$CatSO_x = CatSO_x + \alpha \cdot ExSO_x$]. After step 6 is finished, a command is given to return to step 1; however, as the fuel is not normally changed frequently, it can be suitable to return to step 2.

In step 4, when the inlet temperature Tcat is higher than the threshold value TA, a command is given to proceed to step 7. In step 7, it is determined whether or not the cumulative quantity of $SO_x$ ($CatSO_x$) is greater than a threshold value SA. In step 7, when the cumulative quantity of $SO_x$ ($CatSO_x$) is smaller than the threshold value SA, a command is given to proceed to step 8. In step 8, the regeneration control unit 17 is controlled in response to the operational condition of the engine 1, and outputs an instruction to the flow rate control valve 10 so that a quantity of addition W of the reductant fuel, which is suitable for controlling the $NO_X$ being discharged from the engine 1, is added.

In the present embodiment, the flow of the exhaust emissions is obtained from the data read in step 2 as the operational condition of the engine 1, specifically, from the engine speed Na and the load Pa of the engine 1. Further, in the present embodiment, the necessary quantity of reductant fuel to be added is obtained from the performance of the $NO_X$ catalyst 3, and from the quantity of $NO_X$ discharged, which is obtained by multiplying the flow of exhaust emissions by the $NO_X$ concentration value in the exhaust emissions, which is obtained from the $NO_X$ concentration sensor 15. However, when used for a truck or the like, a $NO_X$ concentration sensor which can be initially used on board has not been developed; therefore, map data can be previously prepared, and the quantity of the reductant fuel to be added can be obtained from the engine speed Na and the load Pa.

After completing step 8, a command is given to return to step 1, but as in step 6, it is suitable to return to step 2. When the cumulative quantity of $SO_x$ ($CatSO_x$) is greater than the threshold value SA in step 7, a command is given to go to step 9.

In step 9, an instruction is issued to the flow rate control valve 10 to add into the exhaust pipe 2 the addition quantity W of the reductant fuel that is calculated and instructed in step 8, which is further incremented by a predetermined quantity R, specifically the addition quantity (W+R). The first object of the above is to attain the necessary $NO_X$ control performance, which can be attained only by adding the addition quantity (W+R), which is greater than the addition quantity W which is suitable for the current operational condition of the engine 1. The second object is to increase the regeneration speed of the $NO_X$ catalyst 3 which has been deteriorated by $SO_x$. In the present embodiment, the increase quantity R is always fixed, irrespective of the operational condition of the engine 1, but a control can be carried out by incrementing the addition quantity W, determined by the current operational condition of the engine 1, by a fixed ratio r. In this situation, the same operation as executed in step 8 is also carried out in step 9.

After completing step 9, a command is given to proceed to step 10, and based on the current operational condition of the engine 1, the $NO_X$ catalyst inlet temperature Tcat, the cumulative quantity of $SO_x$ (CatSO$_x$), and the reductant fuel addition quantity R, the $SO_x$ quantity Us, which is eliminated from the $NO_X$ catalyst 3 under this condition, is obtained.

Figure 3:
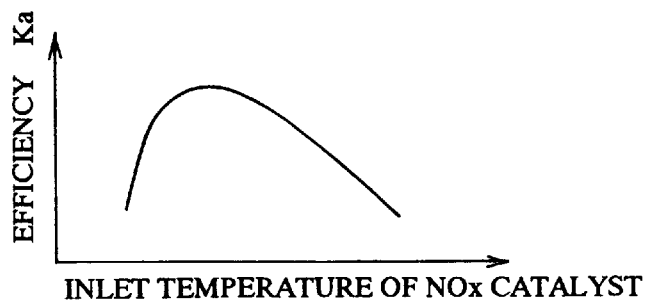
FIG. 3 is a graph showing the relationship between the temperature of the $NO_x$ catalyst and the $SO_x$ elimination efficiency in the $NO_x$ catalyst according to the first embodiment of the present invention.
Figure 4:
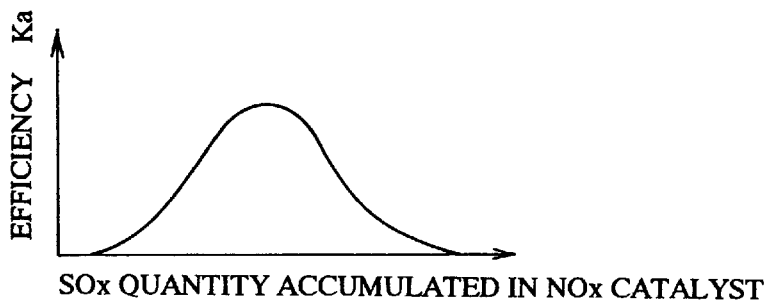
FIG. 4 is a graph showing the relationship between the cumulative quantity of the $SO_x$ in the $NO_x$ catalyst and the $SO_x$ elimination efficiency in the $NO_x$ catalyst according to the first embodiment of the present invention.

In the present embodiment, the $NO_X$ concentration in the exhaust emissions, which is obtained from the $NO_X$ concentration sensor 15, is measured. The efficiency Ka, with which the $SO_x$ in the $NO_X$ catalyst 3 is eliminated, depends on the concentration of a nitrogen-containing hydrocarbon compound generating on the surface of the catalyst, specifically, on the $NO_X$ concentration in the exhaust emissions, the quantity of reductant fuel added, and the temperature of the exhaust gas. Regarding the temperature, the elimination efficiency Ka has the most suitable temperature as shown in FIG. 3. In FIG. 3, the axis of abscissa shows the temperature, and the axis of ordinates shows the efficiency Ka with which the $SO_x$ in the $NO_X$ catalyst 3 is eliminated. When the integrated quantity of $SO_x$ (CatSO$_x$) is greater, the elimination efficiency Ka is smaller, as shown in FIG. 4. In FIG. 4, the axis of abscissa shows the quantity of the $SO_x$ accumulated in the $NO_X$ catalyst 3, and the axis of ordinates shows the efficiency Ka with which the $SO_x$ in the $NO_X$ catalyst 3 is eliminated. Including all of these conditions, the generation control unit 17 obtains the quantity Us of $SO_x$ eliminated from the $NO_X$, catalyst 3, specifically, the regeneration quantity Us of the $NO_X$ catalyst 3 from the $SO_x$ deterioration.

In step 11, according to the quantity Us of the $SO_x$ eliminated from the $NO_X$ catalyst 3, the numeral data of the cumulative quantity of $SO_x$ (CatSO$_x$) in the $NO_X$ catalyst 3 is renewed according to the equation [CatSO$_x$=CatSO$_x$−Us]. After finishing step 11, a command is given to proceed to step 12, and it is determined whether or not the engine 1 is being operated. When it is determined that the engine 1 is being continuously operated, a command is given to return to step 1, but it is also suitable to return to step 2, as in step 6.

By cyclically repeating the aforesaid series, the quantity of $SO_x$ (CatSO$_x$) accumulated in the $NO_X$ catalyst 3 is reduced, and after a while, it is determined in the determining operation in step 7 that the regeneration of the $NO_X$ catalyst 3 is finished.

When it is determined that the engine 1 is stopped in step 12, the control is ended. At the time when the engine 1 is stopped, the $NO_X$ catalyst 3 normally maintains the current deterioration state due to $SO_x$. For this reason, in the present embodiment, the data of the $SO_x$ quantity (CatSO$_x$) accumulated in the $NO_X$ catalyst 3 at this time is stored in a non-volatile memory which can be held even in a situation in which the engine 1 is stopped. The next time the engine 1 is operated, the decree of the deterioration of the $NO_X$ catalyst 3 by $SO_x$ is computed by using the stored data.

Figure 5:
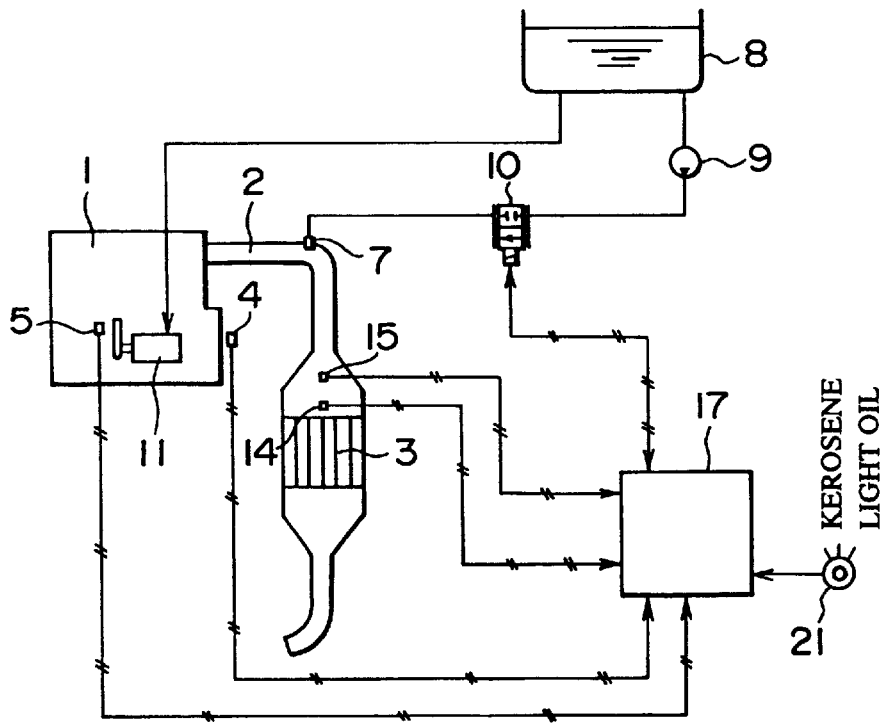
FIG. 5 is an explanatory diagram of a configuration of an apparatus for regenerating a $NO_x$ catalyst for a diesel engine according to a second embodiment of the present invention.

FIG. 5 is an explanatory diagram of the configuration of an apparatus for regenerating the $NO_X$ catalyst 3 of the diesel engine 1 according to a second embodiment of the present invention. The same components as in the first embodiment are given the identical numerals and symbols, and the explanation thereof will be omitted. In the first embodiment, the component detecting sensor 16 is used for detecting the component of the fuel used for operating the engine 1, but in the second embodiment, a selector switch 21, for indicating the kind of diesel fuel, is provided; and the selector switch 21 is connected to the regeneration control unit 17. For example, the positions for indicating kerosene, light oil, and the like, are provided at the selector switch 21, and the positions are switched by an operator according to the kind of the diesel fuel to be used.

Figure 6:
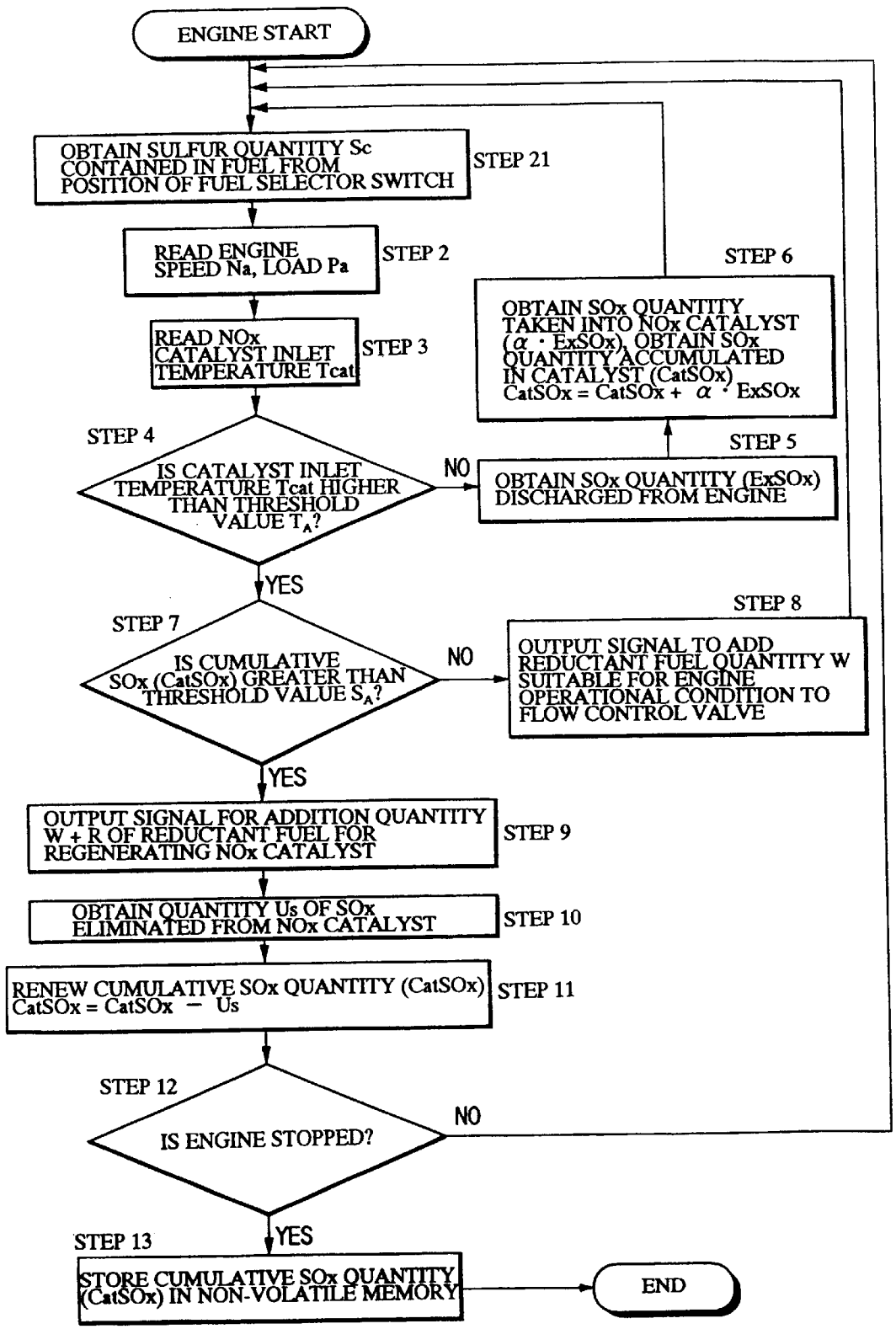
FIG. 6 is a flowchart of a method for regenerating the $NO_x$ catalyst according to the second embodiment of the present invention.

A control method in the second embodiment will be explained with reference to the flow shown in FIG. 6. The same steps as in the first embodiment are given the same step numbers, and the explanation thereof will be omitted. In step 21, based on the position of the selector switch 21, which is set by an operator, the controller in the regeneration control unit 17 determines the concentration of sulfur Sc contained in the indicated diesel fuel. Next, a command is given to go to step 2; but the operations in step 2 and thereafter are the same as in the first embodiment, the explanation will be omitted.

Figure 7:
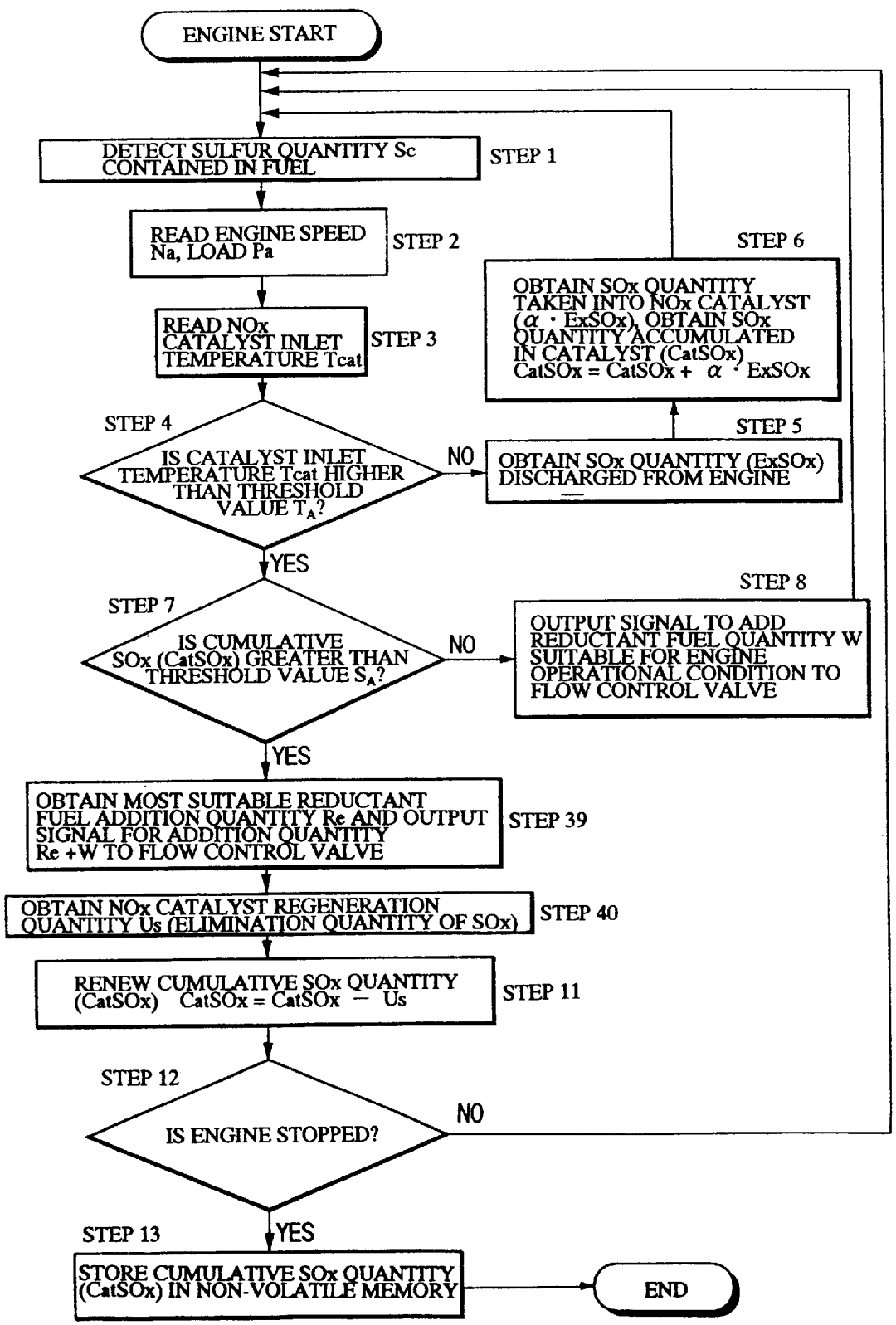
FIG. 7 is a flowchart of a method for regenerating a $NO_x$ catalyst according to a third embodiment of the present invention.

Next, a method for controlling the $NO_X$ catalyst 3 in the diesel engine 1 according to a third embodiment will be explained with reference to the flow shown in FIG. 7. The mechanical features in the third embodiment are the same as in the first or second embodiment; therefore, the explanation will be omitted. The same steps as in the first embodiment are given the same step numbers, and the explanation thereof will be omitted. The operations in steps 1 to 7, in step 8, and in step 11 and thereafter are the same as in the first embodiment. In the third embodiment, steps 39 and 40 are different from steps 9 and 10 in the first embodiment.

In step 7, when the cumulative $SO_x$ quantity (CatSO$_x$) in the $NO_X$ catalyst 3 is greater than the threshold value SA, a command is given to go to step 39. In step 39, in order to eliminate the accumulated $SO_x$ (CatSO$_x$) in the $NO_X$ catalyst 3, the reductant fuel addition quantity Re, which is the most efficient at the time, specifically, the most suitable, is computed.

Figure 8:
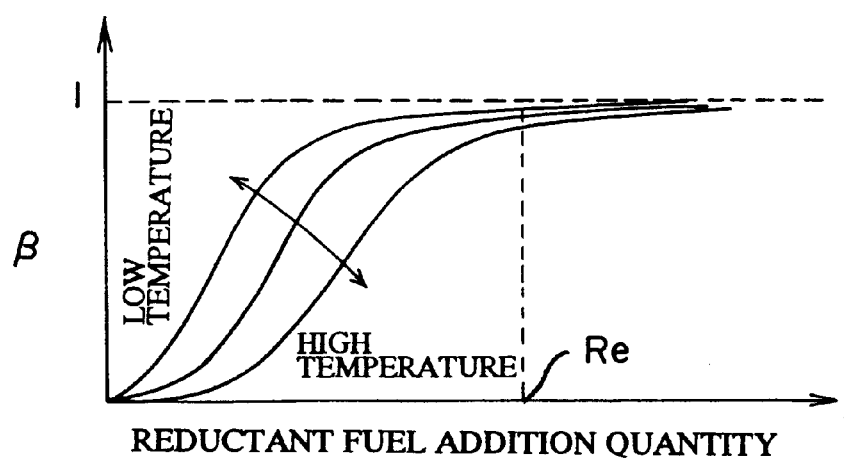
FIG. 8 is a graph showing the relationship between the addition quantity of reductant fuel and the $SO_x$ elimination efficiency in the $NO_x$ catalyst according to the third embodiment of the present invention.

The addition quantity Re will be explained. The elimination efficiency Ka of the $SO_x$ in the $NO_X$ catalyst 3 is increased following an increase in the addition quantity of the reductant fuel, but it tops out after a while. In FIG. 8, the addition quantity of the reductant fuel for eliminating the accumulated $SO_x$ is shown by the axis of abscissa, and a ratio β of the elimination efficiency Ka to the maximum efficiency Kmax, with which $SO_x$ in the $NO_X$ catalyst 3 is eliminated, is shown by the axis of ordinates. As known from FIG. 8, the addition quantity with which the efficiency begins to top out becomes smaller as the temperature of the exhaust gas becomes lower. Further, as described in the explanation of the regeneration method in the first embodiment, the ratio β varies, depending on the operational condition of the engine 1, the inlet temperature Tcat of the $NO_X$ catalyst 3, and the integrated $SO_x$ quantity (CatSO$_x$). The regeneration control unit 17 determines the most suitable addition quantity Re of the reductant fuel which can most efficiently eliminate the accumulated $SO_x$ from the $NO_X$ catalyst 3 at the time, in consideration of the quantity of consumption of the reductant fuel, specifically, the fuel consumption of the engine 1. The regeneration control unit 17 adds the addition quantity W, which is suitable for the current operational condition of the engine 1, to this most suitable addition quantity Re, and outputs an instruction to the flow rate control valve 10 to add the reductant fuel addition quantity Re+W into the exhaust pipe 2. After finishing step 39, a command is given to proceed to step 40, and the quantity Us of SOx eliminated from the $NO_X$ catalyst 3 by the addition quantity Re is obtained, and a command is given to proceed to step 11 as in the first embodiment, and the operations thereafter are carried out. The explanation thereof will be omitted.

Figure 9:
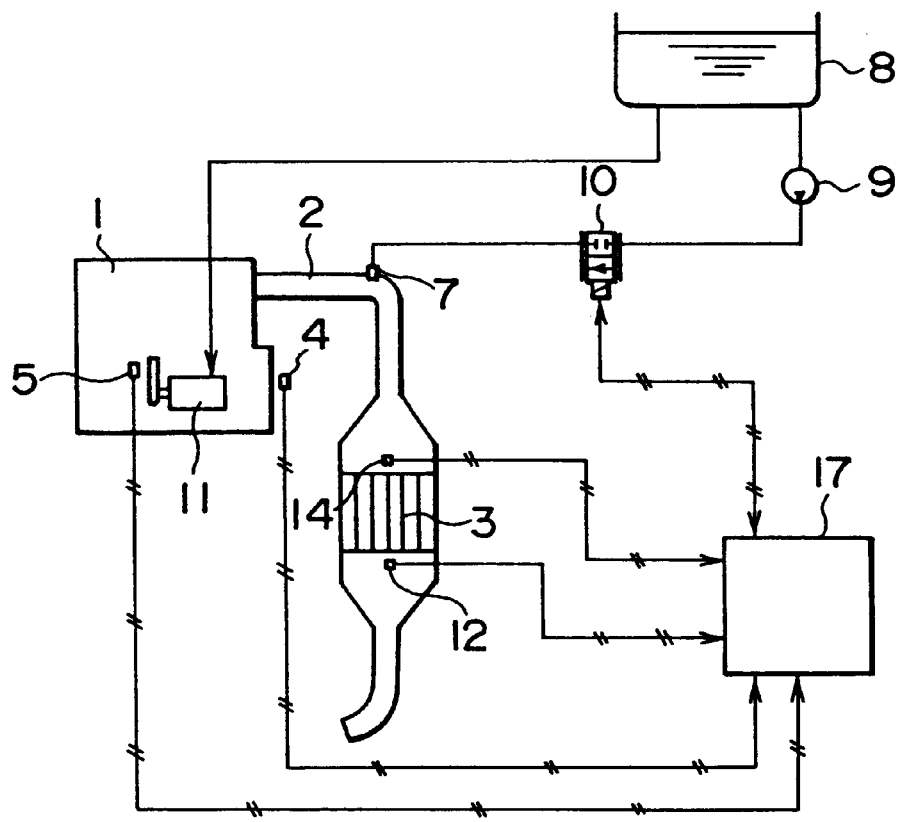
FIG. 9 is an explanatory diagram of a configuration of an apparatus for regenerating a $NO_x$ catalyst for a diesel engine according to a fourth embodiment of the present invention.

Next, the regeneration of the $NO_X$ catalyst 3 according to a fourth embodiment of the present invention will be explained. In the fourth embodiment, as shown in FIG. 9 and as compared with FIG. 1 in the first embodiment, the component detecting sensor 16 and the $NO_X$ concentration sensor 15 are omitted, and a hydrocarbon concentration sensor 12 is disposed in the exhaust pipe 2 at the downstream side of the $NO_X$ catalyst 3. With the hydrocarbon concentration sensor 12, the hydrocarbon concentration HC, in the exhaust gas emitted from the $NO_X$ catalyst 3, is detected.

Figure 10:
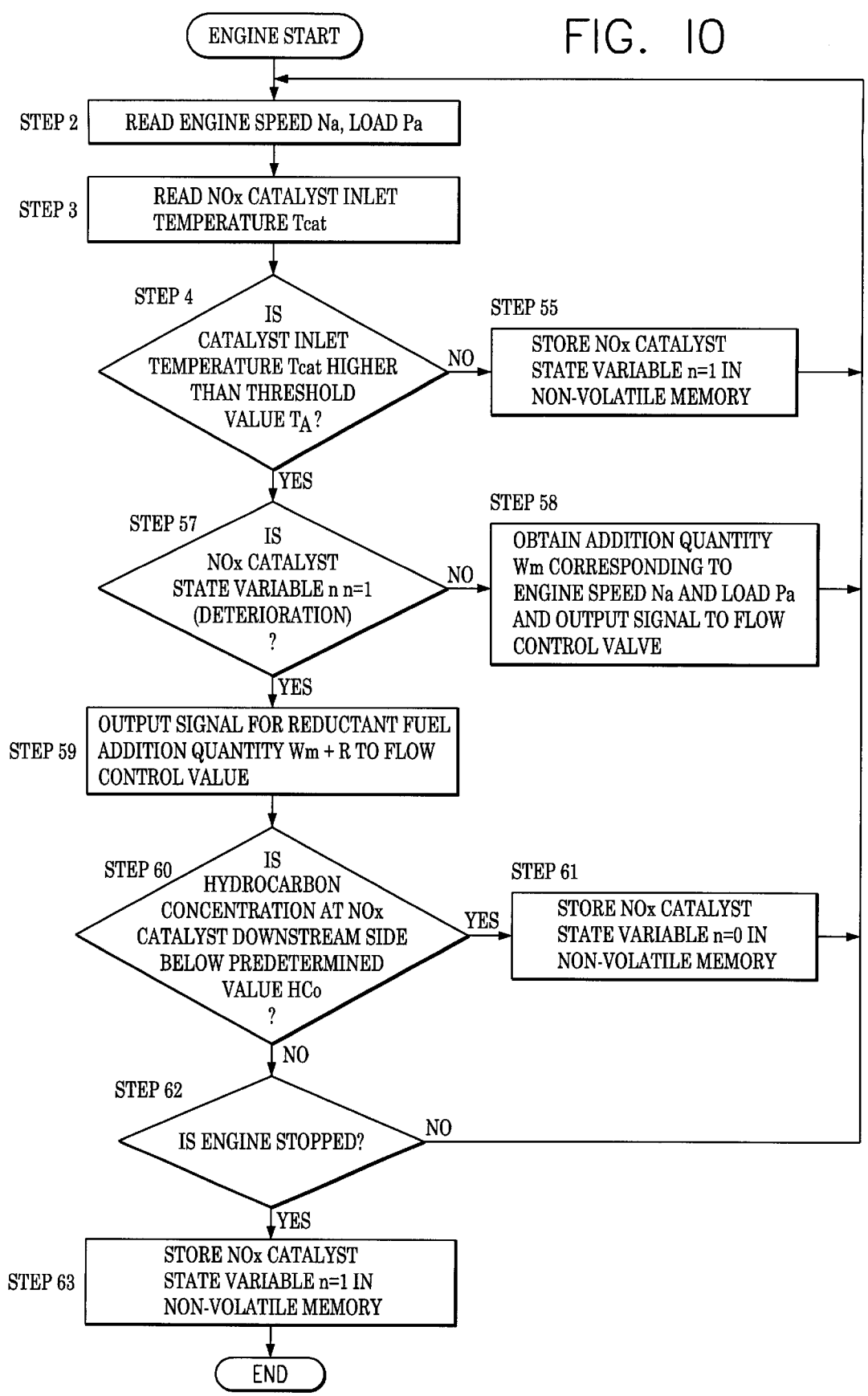
FIG. 10 is a flowchart of a method for regenerating the $NO_x$ catalyst according to the fourth embodiment of the present invention.

A method for regenerating the $NO_X$ catalyst 3 with the above configuration will be explained with reference to the flowchart shown in FIG. 10. As compared to the first embodiment, step 2 to step 4 are the same, but step 1 is omitted and stops after step 4 are changed.

When the inlet temperature Tcat is not higher than the threshold value TA in step 4, a command is given to go to step 55. In step 55, the regeneration control unit 17 stores a state variable n=1 of the $NO_X$ catalyst 3 in a non-volatile memory (not illustrated), and then a command is given to return to step 2. The state variable n is a variable showing the state of the $NO_X$ catalyst 3 caused by the accumulation of $SO_x$, and "n=0" is set as a not-yet-deteriorated state of the $NO_X$ catalyst 3, while "n=1" is set as a deteriorated state of the $NO_X$ catalyst 3. It should be noted that when "the inlet temperature Tcat is lower" in step 4, the $NO_X$ catalyst 3 is not necessarily in a deteriorated state, specifically, before the determination of the state. However, even if the inlet temperature Tcat is low, it is possible that the $NO_X$ catalyst 3 is deteriorated by the accumulation of $SO_x$ therein; therefore, the situation in which "the inlet temperature Tcat is lower" in step 4 is set as a deteriorated state.

When the inlet temperature Tcat is higher than the threshold value TC in step 4, a command is given to go to step 57, and it is checked whether the state variable n of the $NO_X$ catalyst 3, which is stored in the non-volatile memory, is "1" (a deteriorate state), or "0" (a not-yet-deteriorated state). When n=0, a command is given to go to step 58, and when n=1, a command is given to go to step 59.

Figure 11:
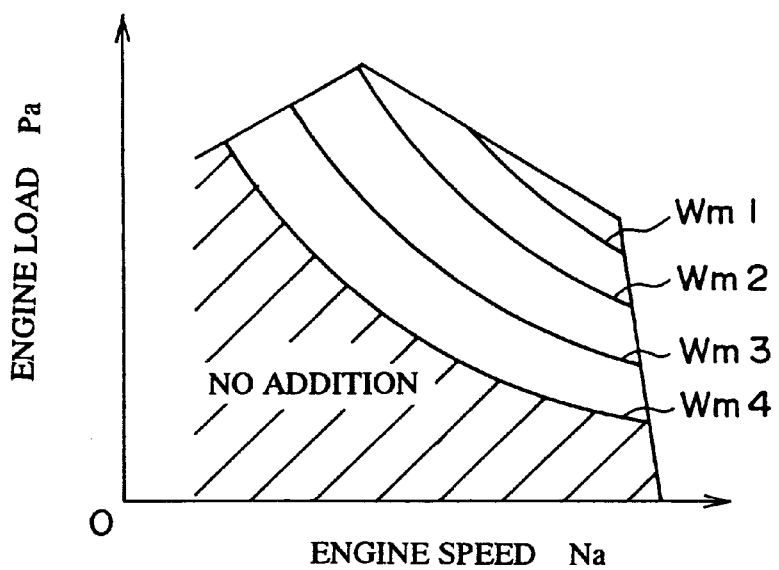
FIG. 11 is a map of the addition quantity of reductant fuel according to the fourth embodiment of the present invention.

In step 58, the regeneration control unit 17 obtains the addition quantity Wm of the reductant fuel corresponding to the data of the engine speed Na and the engine load Pa (for example, torque) which are read in step 2 from an addition quantity map (see FIG. 11) preciously stored, and issues an instruction to the flow control valve 10 to add the addition quantity Wm into the exhaust pipe 2. The addition quantity Wm is the quantity suitable for the controlling the $NO_X$, discharged from the engine 1 with the engine speed Na and the load Pa which are read. In FIG. 11, as a level of addition quantity Wm, the addition quantity level lines Wm1 to Wm4 (the addition quantity: Wm1>Wm4) are only shown in the drawing, but the higher load side of the addition quantity level line Wm1 and each portion between the addition quantity level lines Wm1 to Wm4 can be further divided into smaller meshes. Addition quantities Wm11, Wm12, . . . are inputted at the respective meshes. In an area where the engine speed Na or the load Pa is small or the inlet temperature Tcat is low, the $NO_X$ catalyst 3 does not effectively operate; therefore, in the present embodiment, the reductant fuel is not added. After step 58 is finished, a command is given to return to step 2.

In step 59, the regeneration control unit 17 instructs the flow rate control valve 10 to add into the exhaust pipe 2 the reductant fuel which is the addition quantity Wm, calculated and instructed in the same manner as in step 58, further incremented by a predetermined quantity R, specifically, the addition quantity (Wm+R). The objects of predetermined addition quantity R, and of adding the incremented quantity (Wm+R) are the same as in the first embodiment. Instead of being incremented by the predetermined quantity R, the addition quantity Wm can be incremented by the fixed ratio r as in the first embodiment.

Figure 12:
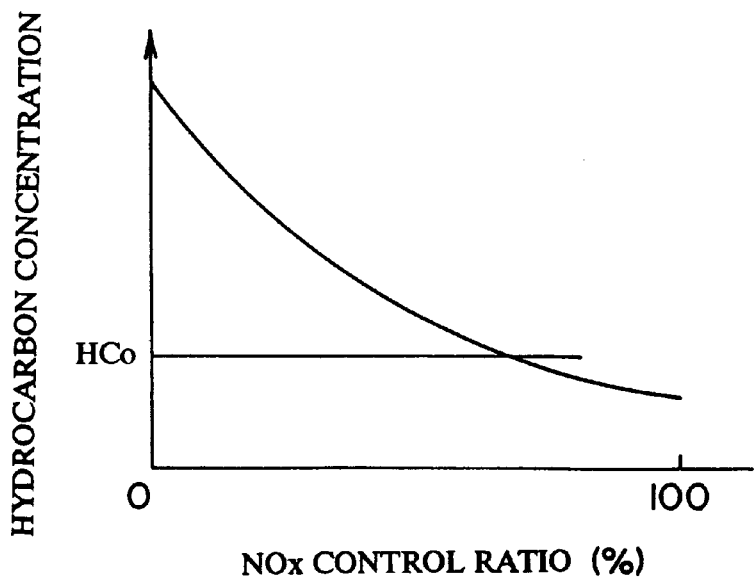
FIG. 12 is a graph showing the relationship among a $NO_x$ controlling ratio, a hydrocarbon concentration, and a predetermined value of the hydrocarbon concentration according to the fourth embodiment of the present invention.
Figure 13A:
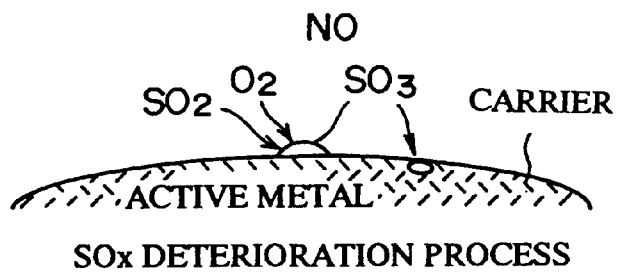
FIG. 13A to FIG. 13D are explanatory diagrams for explaining steps in a mechanism from $SO_x$ deterioration to reactivation of the $NO_x$ catalyst according to the present invention.
Figure 13B:
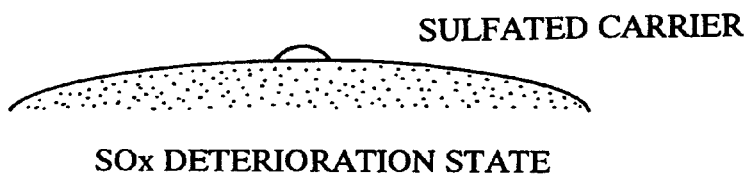
Figure 13C:
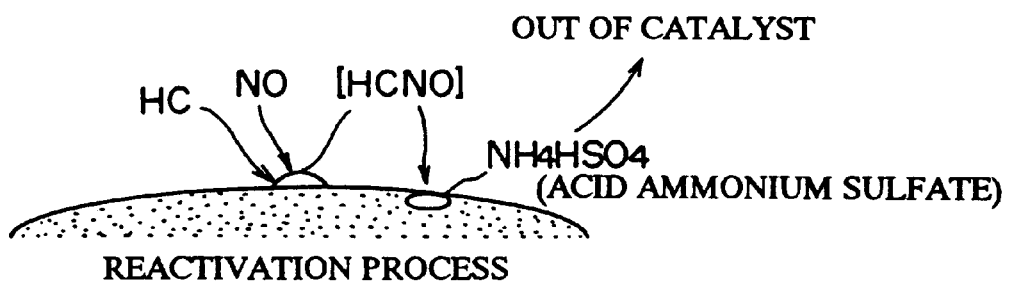
Figure 13D:

In step 60, the regeneration control unit 17 determines whether or not the hydrocarbon concentration HC at the downstream side of the $NO_X$ catalyst 3, which is detected by the hydrocarbon concentration sensor 12, is less than a predetermined value HCo; and if it is less than the predetermined value HCo, a command is given to go to step 61. If it is less than the predetermined value HCo, as shown in FIG. 12, the $NO_X$ control rate is higher, specifically, the $NO_X$ catalyst 3 is in a good condition. Accordingly, in step 61, the state variable n=0 of the $NO_X$ catalyst 3 is stored in a non-volatile memory, and a command is given to return to step 2.

If the hydrocarbon concentration HC is greater than the predetermined value HCo, a command is given to go to step 62, and it is determined whether or not the engine 1 is being operated. When it is determined that the engine 1 is being continuously operated, a command is given to return to step 2. On the other hand, when the engine 1 is stopped, a command is given to go to step 63, and the state variable n=1 of the $NO_X$ catalyst 3, specifically, the deterioration state, is stored in the non-volatile memory, and the processing is ended. By repeating the above cycle of the present embodiment, the quantity of $SO_x$ ($CatSO_x$) of the $NO_X$ catalyst 3 is also reduced, and the $NO_X$ catalyst 3 is regenerated.

In step 58 in the fourth embodiment, the reductant fuel addition quantity Wm is obtained from the addition quantity map in FIG. 11, but it is suitable to provide the $NO_X$ concentration sensor 15 as shown in FIG. 1 and to obtain the addition quantity W as in step 8 of the first embodiment.

According to the present invention described above, with respect to a $NO_X$ catalyst 3, which is abruptly deteriorated by $SO_x$, the feed rate of the fuel to the engine 1 is obtained when the inlet temperature Tcat of the $NO_X$ catalyst 3 is not higher than the predetermined value TA. The quantity of $SO_x$, which is taken into the $NO_X$ catalyst 3 during a period of time in which the inlet temperature Tcat is not higher than the predetermined value TA, is calculated; and when the inlet temperature Tcat is higher than the predetermined value TA as a result of the operational condition of the engine 1 having been changed and the reductant fuel is started to be supplied, a quantity of reductant fuel, which is more than the quantity of reductant fuel which is suitable for the operational condition, is supplied into the exhaust emissions to regenerate the $NO_X$ catalyst 3 in the exhaust pipe 2. Thus, sufficient $NO_X$ control performance is obtained even from the $NO_X$ catalyst 3 which has been deteriorated by $SO_x$, and the $NO_X$ catalyst 3 can be recovered from the deterioration by $SO_x$ in a short time.

Industrial Availability

The present invention is useful as an apparatus and a method for regenerating a $NO_X$ catalyst for a diesel engine, which can regenerate a catalyst having a lower performance as a result of an accumulation of $SO_x$ in the $NO_X$ catalyst due to sulfur existing in the fuel which is supplied to the diesel engine.

What is claimed is:

1. An apparatus comprising:
    an exhaust pipe;
    a $NO_X$ catalyst device, positioned in said exhaust pipe, said $NO_X$ catalyst device containing a $NO_X$ catalyst which has a performance for reducing $NO_X$ in exhaust gas passing through said exhaust pipe, which performance is lowered by said $NO_X$ catalyst absorbing $SO_x$ from said exhaust gas;
    a reductant fuel adding nozzle, associated with said exhaust pipe for adding a reductant fuel into said exhaust pipe at a location upstream of said $NO_X$ catalyst;
    a flow rate control valve, for controlling a feed rate of the reductant fuel to said reductant fuel adding nozzle;
    a $NO_X$ catalyst temperature sensor, disposed in said exhaust pipe for providing a temperature signal representative of a temperature of said $NO_X$ catalyst; and
    a regeneration control unit which computes a quantity of $SO_x$ absorbed into said $NO_X$ catalyst during a period of time when said temperature signal indicates that the temperature of said $NO_X$ catalyst is not higher than a predetermined value and an instruction of a zero feed rate is given to said flow rate control valve; and
    wherein, when said temperature exceeds said predetermined value and reductant fuel is being fed to said nozzle, said regeneration control unit outputs an instruction to said flow rate control valve to supply to said nozzle a larger quantity of reductant fuel, which is larger than a predetermined quantity which is suitable for a current operational condition;
    whereby the addition of said larger quantity of reductant fuel effects a regeneration of said $NO_X$ catalyst.

2. Apparatus in accordance with claim 1, further comprising a diesel engine; wherein said exhaust pipe is connected to said diesel engine for passage of exhaust gas from said diesel engine through said exhaust pipe; and wherein said predetermined quantity is a quantity which is suitable for a current operational condition of said diesel engine.

3. Apparatus in accordance with claim 1, wherein during said period of time said regeneration control unit gives said instruction of a zero feed rate to said flow rate control valve responsive to a quantity of diesel fuel injected into said diesel engine during said period of time.

4. Apparatus in accordance with claim 3, further comprising means for determining a rate of injection of diesel fuel into said diesel engine; and wherein said regeneration control unit ascertains said current operational condition of said diesel engine from a currently determined rate of injection of diesel fuel into said diesel engine.

5. Apparatus in accordance with claim 2, further comprising:
    means for determining a rate of injection of diesel fuel into said diesel engine; and
    one of a selector switch, for indicating a type of diesel fuel for said diesel engine, and a component sensor, for detecting a sulfur content in the diesel fuel for said diesel engine;
    wherein said regeneration control unit computes a quantity of $SO_x$ discharged from said diesel engine, based on the rate of injection of diesel fuel into said diesel engine and one of a signal from said selector switch and a signal from said component sensor.

6. Apparatus in accordance with claim 1, wherein said $NO_X$ catalyst temperature sensor is disposed in said exhaust pipe at an inlet of said $NO_X$ catalyst for providing a temperature signal representative of an inlet temperature of said $NO_X$ catalyst.

7. Apparatus comprising:
    a diesel engine;
    an exhaust pipe connected to said diesel engine for passage of exhaust gas from said diesel engine through said exhaust pipe;
    a $NO_X$ catalyst device, positioned in said exhaust pipe, said $NO_X$ catalyst device containing a $NO_X$ catalyst which has a performance for reducing $NO_X$ in exhaust gas passing through said exhaust pipe, which performance is lowered by said $NO_X$ catalyst absorbing $SO_x$ from said exhaust gas;
    a reductant fuel adding nozzle, associated with said exhaust pipe for adding a reductant fuel into said exhaust pipe at a location upstream of said $NO_X$ catalyst;
    a flow rate control valve, for controlling a feed rate of the reductant fuel to said reductant fuel adding nozzle;
    a $NO_X$ catalyst temperature sensor, disposed in said exhaust pipe for providing a temperature signal representative of a temperature of said $NO_X$ catalyst;
    a hydrocarbon concentration sensor disposed at a downstream side of said $NO_X$ catalyst to provide a hydrocarbon concentration signal representing a hydrocarbon concentration in the exhaust gas at the downstream side of said $NO_X$ catalyst; and
    a regeneration control unit;
    wherein, when said temperature signal indicates that the temperature of said $NO_X$ catalyst is higher than a predetermined value and said hydrocarbon concentration signal indicates that the hydrocarbon concentration at the downstream side of said $NO_X$ catalyst is greater than a predetermined amount, said regeneration control unit determines that said $NO_X$ catalyst is deteriorating and outputs an instruction to said flow rate control valve to supply a quantity of reductant fuel which is larger than a predetermined quantity which is suitable for a current operational condition of said diesel engine, to thereby regenerate said $NO_X$ catalyst.

8. A method for regenerating a $NO_X$ catalyst in a $NO_X$ catalyst device for a diesel engine, which device contains a $NO_X$ catalyst which has a performance for reducing $NO_X$ in exhaust gas passing through an exhaust pipe of said diesel engine when a reductant fuel is added to said exhaust pipe upstream of said $NO_X$ catalyst, which performance is lowered by said $NO_X$ catalyst absorbing $SO_x$ from said exhaust gas, said method comprising the steps of:
    computing a quantity of $SO_x$ which is taken into said $NO_X$ catalyst during a period of time in which said diesel engine is operated and in which a reductant fuel is not added to said exhaust pipe at a location upstream of said $NO_X$ catalyst because a temperature of said $NO_X$ catalyst is not higher than a predetermined value; and when said temperature of said $NO_X$ catalyst is higher than said predetermined value and the reductant fuel is to be added to said exhaust pipe at a location upstream of said $NO_X$ catalyst, adding to said exhaust pipe at said location upstream of said $NO_X$ catalyst a large quantity of reductant fuel, which is larger than a predetermined quantity of reductant fuel which is suitable for a current operational condition of said diesel engine, to thereby regenerate $NO_X$ catalyst which has been deteriorated by absorption of $SO_x$.

9. A method in accordance with claim 8, wherein said large quantity of reductant fuel is a combination of (a) the predetermined quantity of reductant fuel which is suitable for the current operational condition and (b) a fixed quantity of reductant fuel, a value of the fixed quantity being irrespective of the current operational condition.

10. A method in accordance with claim 8, wherein said large quantity of reductant fuel is a combination of (a) the predetermined quantity of reductant fuel which is suitable for the current operational condition and (b) an increment of said predetermined quantity at a fixed ratio.

11. A method in accordance with claim 8, wherein said large quantity of reductant fuel is a variable quantity which is computed from a $NO_X$ concentration in the exhaust gas, an exhaust gas flow rate, and an exhaust gas temperature which are determined by the current operational condition, and from the quantity of $SO_x$ taken into said $NO_X$ catalyst.

12. A method in accordance with claim 8, wherein a computation of the quantity of $SO_x$ taken into said $NO_X$ catalyst is based on a feed rate of diesel fuel to said diesel engine.

13. A method in accordance with claim 8, further comprising the steps of:

when (a) the current operational condition of said diesel engine changes, (b) said temperature is not higher than said predetermined value, and (c) an addition of reductant fuel is stopped before a regeneration of said $NO_X$ catalyst is completed, storing a cumulative quantity of $SO_x$ in the $NO_X$ catalyst at a time of stopping said addition; and obtaining a quantity of $SO_x$ accumulated in said $NO_X$ catalyst, during a period of time in which addition of the reductant fuel is stopped, by successively adding a quantity of $SO_x$, which is taken into said $NO_X$ catalyst according to an operational condition of the diesel engine during said period of time, to thus stored cumulative quantity of $SO_x$.

14. A method in accordance with claim 8, further comprising the steps of:

when said diesel engine is stopped before a regeneration of said $NO_X$ catalyst is completed, holding in a nonvolatile memory the cumulative quantity of $SO_x$ in the $NO_X$ catalyst at a time of stopping said diesel engine; and at next time said diesel engine is operated, successively adding a quantity of $SO_x$, which is newly taken into said $NO_X$ catalyst, to thus held cumulative quantity of $SO_x$.

15. A method in accordance with claim 8, wherein the step of computing the quantity of $SO_x$, which is taken into said $NO_X$ catalyst, comprises computing the quantity of $SO_x$, which is taken into said $NO_X$ catalyst, from a sulfur content in diesel fuel supplied to said diesel engine.

16. A method in accordance with claim 8, further comprising the step, when regeneration of said $NO_X$ catalyst is completed, of changing a value of said large quantity of reductant fuel to a quantity which is suitable for driving conditions of the diesel engine at a time of completion of said regeneration.

17. A method in accordance with claim 8, further comprising the steps of:

successively computing a quantity of $SO_x$ which is eliminated from said $NO_X$ catalyst during regeneration and, at the same time, computing a quantity of residual $SO_x$ in said $NO_X$ catalyst during regeneration by subtracting the quantity of $SO_x$, which is eliminated, from a quantity of $SO_x$ which remains in said $NO_X$ catalyst; and determining a point in time, at which regeneration of said $NO_X$ catalyst is determined to be completed, as a time when a calculated quantity of residual $SO_x$ in said $NO_X$ catalyst during regeneration becomes equal to or less than a predetermined value.

18. A method in accordance with claim 17, wherein said step of computing a quantity of $SO_x$ which is eliminated from said $NO_X$ catalyst during regeneration comprises computing from any one of the following: a $NO_X$ concentration in the exhaust gas, a flow rate of the exhaust gas, and an exhaust gas temperature, which are determined by the operational condition of the diesel engine during regeneration; the quantity of $SO_x$ which is taken into said $NO_X$ catalyst; and the quantity of the added reductant fuel.

19. A method for regenerating a $NO_X$ catalyst in a $NO_X$ catalyst device for a diesel engine, which device contains a $NO_X$ catalyst which has a performance for reducing $NO_X$ in exhaust gas passing through an exhaust pipe of said diesel engine when a reductant fuel is added to said exhaust pipe upstream of said $NO_X$ catalyst, which performance is lowered by said $NO_X$ catalyst absorbing $SO_x$ from said exhaust gas, said method comprising the steps of:

determining if a temperature of said $NO_X$ catalyst is higher than a predetermined temperature value;

determining if a hydrocarbon concentration in exhaust gas downstream of said $NO_X$ catalyst is greater than a predetermined concentration value; and when said temperature of said $NO_X$ catalyst is higher than said predetermined temperature value and said hydrocarbon concentration is greater than said predetermined concentration value, determining that the $NO_X$ catalyst is deteriorating, and regenerating the $NO_X$ catalyst, which has been determined to be deteriorating by adding a quantity of the reductant fuel which is larger than a predetermined quantity which is suitable for a current operational condition of said diesel engine.

* * * * *

UNITED STATES PATENT AND TRADEMARK OFFICE
CERTIFICATE OF CORRECTION

PATENT NO.   : 6,199,372 B1
DATED        : March 13, 2001
INVENTOR(S)  : Wakamoto It is certified that error appears in the above-identified patent and that said Letters Patent is hereby corrected as shown below:

Title page,
Item [87] PCT Publication Date: delete "June 11, 1997" and insert -- November 6, 1997 --.

Column 16,
Line 54 (claim 19, line 19), after "deteriorating" insert -- , --.

Signed and Sealed this

Sixth Day of November, 2001

Attest:

NICHOLAS P. GODICI
Attesting Officer   Acting Director of the United States Patent and Trademark Office